United States Patent [19]
Matsunuma et al.

[11] Patent Number: 5,782,941
[45] Date of Patent: Jul. 21, 1998

[54] PARTICULATE TRAP FOR DIESEL ENGINE

[75] Inventors: Kenji Matsunuma; Shiro Nakajima; Naruhito Nakajima, all of Itami, Japan

[73] Assignee: Sumitomo Electric Industries, Ltd., Osaka, Japan

[21] Appl. No.: 717,895

[22] Filed: Sep. 23, 1996

[51] Int. Cl.$^6$ ................................ B01D 29/62
[52] U.S. Cl. .................. 55/282; 55/487; 55/523; 55/DIG. 10; 55/DIG. 30; 60/311; 60/320
[58] Field of Search .......... 55/282, 523, DIG. 10, 55/DIG. 30, 487, 486; 60/295, 303, 311, 320; 95/278, 283; 422/174

[56] References Cited

U.S. PATENT DOCUMENTS

| | | | |
|---|---|---|---|
| 4,686,837 | 8/1987 | Wade et al. | 55/282 |
| 5,405,423 | 4/1995 | Haerle | 55/DIG. 10 |
| 5,458,664 | 10/1995 | Ishii et al. | 55/DIG. 10 |
| 5,551,971 | 9/1996 | Chadderton et al. | 55/DIG. 10 |
| 5,560,757 | 10/1996 | Suzuki et al. | 55/DIG. 10 |
| 5,656,048 | 8/1997 | Smith et al. | 55/282 |

FOREIGN PATENT DOCUMENTS

| | | | |
|---|---|---|---|
| 2063233 | 10/1992 | Canada | 55/DIG. 10 |
| 5-222920 | 8/1993 | Japan . | |
| 6-0257422 | 9/1994 | Japan . | |
| 6-264722 | 9/1994 | Japan . | |
| 8-151919 | 6/1996 | Japan . | |

*Primary Examiner*—C. Scott Bushey
*Attorney, Agent, or Firm*—Wenderoth, Lind & Ponack, L.L.P.

[57] ABSTRACT

A particulate trap which can be used in a medium- or small-sized diesel engine car includes concentrically arranged cylindrical filters made of a three-dimensionally reticulated metallic porous material and a plate-shaped electric heater for regeneration having an output of 400 W or less, and is provided between the filters and spaced therefrom. The filters have a relatively shortened length. The heating amount of the filters by the heater is 0.60 W/cm$^2$ or more. The filter has an increased thickness to make up for reduction in the filter surface area due to the shortened filter length. With this arrangement, it is possible to achieve a high regeneration efficiency with a low-output heater while suppressing heat loss.

5 Claims, 4 Drawing Sheets

5,782,941

PARTICULATE TRAP FOR DIESEL ENGINE

BACKGROUND OF THE INVENTION

The present invention relates to a particulate trap for trapping and removing particulates such as carbon contained in diesel engine emissions.

Exhaust gases from automobiles are a major cause of air pollution. It is therefore very important to develop a technique for removing noxious components in exhausts.

In particular, it is most urgently required to develop a technique for removing particulates contained in diesel engine emissions, which are mainly made up of NOx and carbon.

To remove such noxious components in exhausts, various improvements in the engine itself have been proposed. Such improvements include exhaust gas recirculation (EGR) systems and improved fuel injection systems. But none of them has been a decisive solution. Today, after-treatment methods, in which a particulate trap is provided in an exhaust pipe to trap particulates in exhausts, are considered more practical, and efforts are being made to develop improved after-treatment type exhaust purifying systems.

The best way to dispose of trapped particulates is to burn them, because by burning particulates, it is possible to use the trap repeatedly. Use of a light oil burner to burn particulates for regeneration of the trap is under consideration. But an electric heater is considered more promising, because it is safer and can be controlled more easily. Particulate traps provided with an electric heater are disclosed in Unexamined Japanese Patent Publication 5-222920, 6-257422 and 6-264722.

In the second and third publications, an 800 W and a 700 W heater are used, respectively, for regeneration. Particulate traps with such high-power heaters can be used only in large vehicles such as buses and trucks, because medium-size and compact cars are so small in the capacity of their electric parts (batteries, alternators, relays, etc.) that it is impossible to use such high-power heaters. For smaller cars, it is necessary to use heaters that consume less electric power due to small battery capacity.

If a low-power heater is used, the problem is how to burn particulates with higher efficiency. If a heater used in a conventional trap were simply replaced with a heater with lower power, without changing other specifications of the trap, such a heater could not burn particulates completely due to insufficient heating. As a result, the pressure loss between the filter inlet and outlet, which increases as particulates are trapped, would not recover sufficiently even by the burning particulates. The filtering capacity thus drops.

If the power consumption is reduced by reducing the size and capacity of a conventional trap, the pressure loss property and the particulate trapping capacity will deteriorate.

A particulate trap is required to have high regeneration efficiency, low pressure loss properties and high particulate trapping efficiency. Thus, it is necessary to reduce the power consumption of the heater while maintaining these properties.

An object of the present invention is to provide a particulate trap which satisfies these requirements.

SUMMARY OF THE INVENTION

According to the present invention, there is provided a particulate trap for use with a diesel engine comprising a filter made of a heat-resistant material, and a regenerating heater spaced a distance from an exhaust incoming surface of the filter. The heater has an output of 400 watts or less. The heater and the filter has a length shortened so that the heating amount of the filter is 0.60 watts or less per square centimeter, and the filter has an increased thickness so as to make up for a reduction in the surface area of the filter due to a shortened length of the filter.

For higher heat resistance and less pressure loss, the filter may be one of a three-dimensionally reticulated metallic porous member such as metal foam, a ceramic fiber, a metallic unwoven fabric, and a combination thereof.

For more surface area (or filtering area), the filter may be selected from a filter comprising a single cylinder having one end thereof closed, a filter comprising a plurality of cylinders having different diameters from one another and arranged concentrically with one another with the spaces between the adjacent cylinders closed alternately at one and the other ends thereof, and a filter comprising a plurality of flat plates arranged parallel to one another with the spaces between the adjacent plates closed alternately at one and the other ends thereof.

The filter should be constructed of a plurality of filter members laminated one on another, each of the filter members being made of a coarser material at a nearer side to the exhaust incoming surface than at remote side thereof. This insures that even if the filter thickness is increased, the particulate is trapped uniformly over the entire range in the direction of thickness. Also the pressure loss property is improved.

In order that the particulate trap according to the present invention, having a heater with an output of 400 watts or less, exhibits the abovementioned properties in a balanced manner, its filter should have a length of 220 mm or less and a thickness of 4 mm or more.

By using a shorter heater and a shorter filter, it is possible to increase the heating temperature to a higher level, provided the electric power consumed by the heater is the same. The higher the heating temperature, the greater the temperature difference between the filter and the heater, and thus the higher the heat transfer efficiency from the heater to the filter. In particular, the amount of heat transferred by radiation increases in proportion to the fourth power of the heating temperature. Thus, it is advantageous to use a short heater and filter.

Also, a short filter is small in heat radiating surface, through which heat transferred to the filter can radiate. That is, such a filter is low in heat loss.

But a short filter, which is correspondingly small in surface area, is easily clogged with particulates, so that pressure loss properties tend to be poor. The filter according to the present invention has an increased thickness to make up for such reduction in surface area. Thus, its pressure loss properties will not deteriorate as markedly. This effect is especially remarkable in an arrangement in which the coarseness of the filter changes in the direction of thickness of the filter so that particulates will be trapped uniformly over the entire thickness of the filter.

Since the filter according to the present invention is high in heat transfer efficiency and low in heat loss, its regeneration efficiency is sufficiently high even though it is rather thick.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Embodiments of the present invention will now be described.

Figure 1:
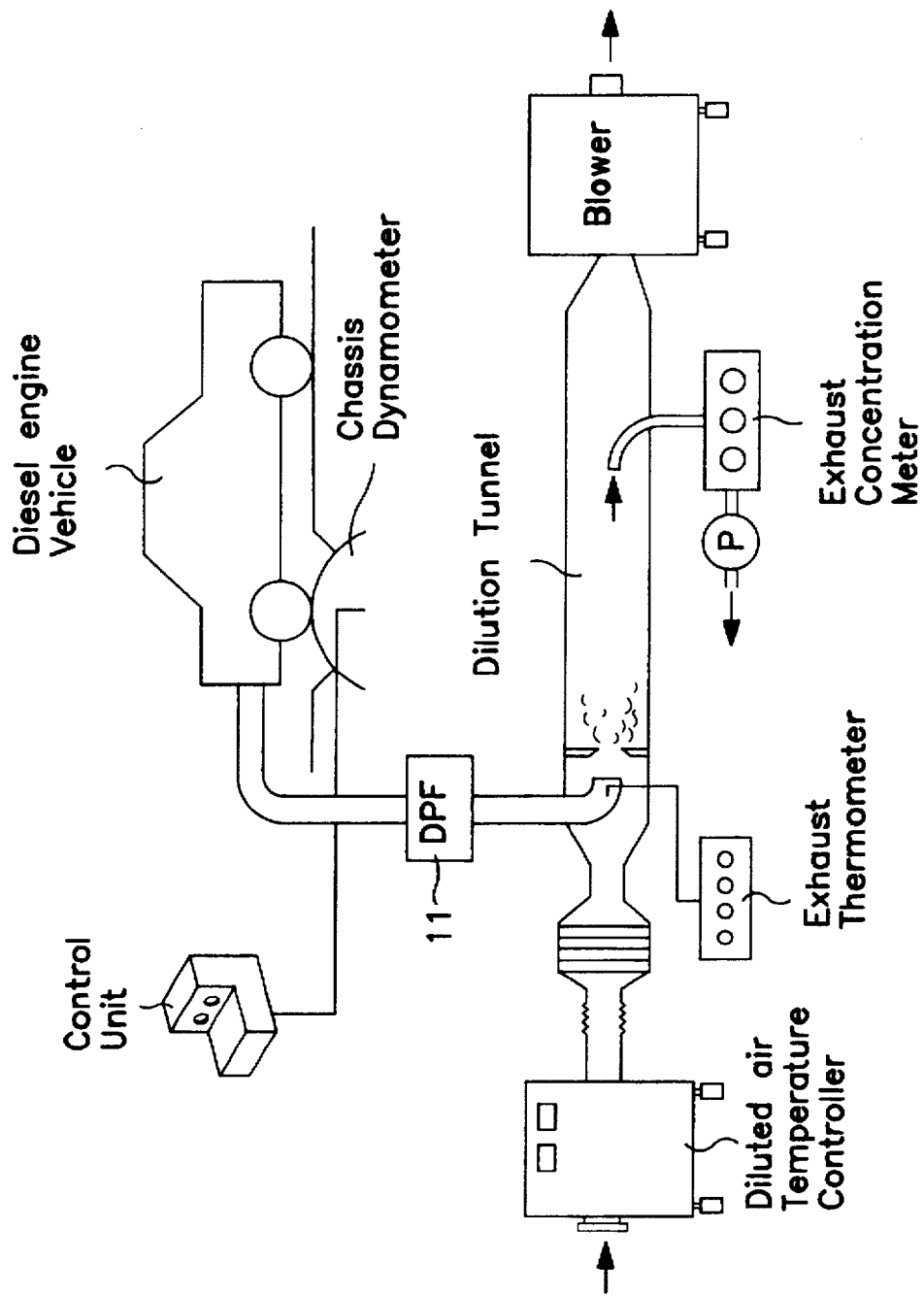
FIG. 1 is a schematic view of an experiment device used to evaluate regeneration properties.

FIG. 1 shows an experiment device, which comprises a 3400-cc, four-cylinder, direct-injection diesel engine vehicle, a chassis dynamometer, a DPF (diesel particulate trapping filter) 11 and a dilution tunnel.

Figure 2:
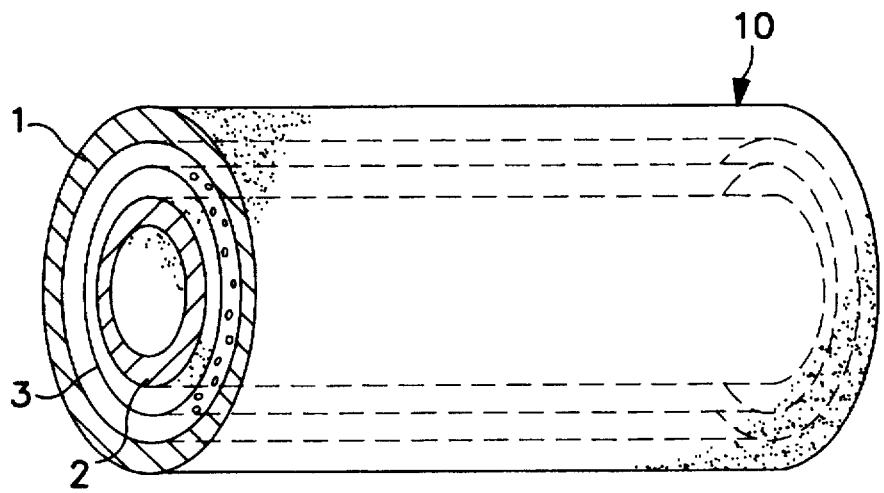
FIG. 2 is a perspective view of a main component (filter element with a heater) of a particulate trap according to the present invention.

FIG. 2 shows a diesel engine particulate trap according to the present invention including a filter element 10. It comprises two cylindrical filters 1 and 2 having different diameters from each other and arranged concentrically with each other, and a heater 3 disposed between the filters 1 and 2. The heater-equipped filter element 10 is mounted in a housing of DPF 11 shown in FIG. 1.

Figure 3:
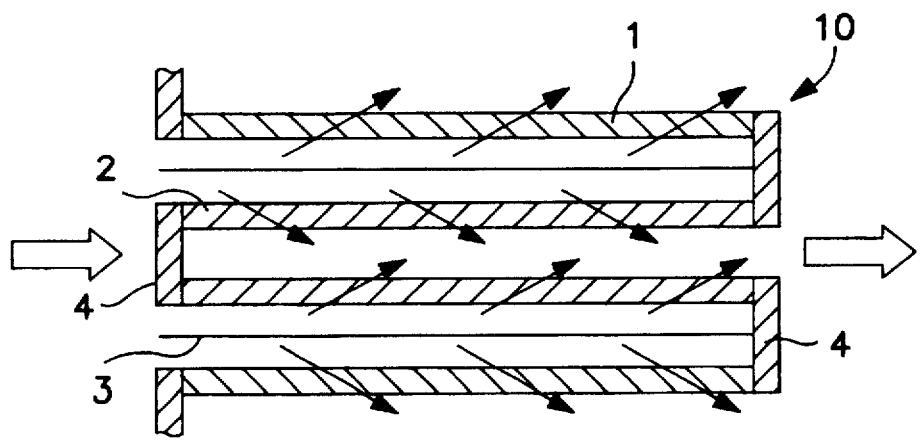
FIG. 3 is a sectional view of the filter element with the heater of FIG. 2.

FIG. 3 shows a section of the heater-equipped filter element 10 shown in FIG. 2. Exhaust is introduced into the space between the filters 1 and 2, pass through the respective filters, and flow to the outside of the filter 1 and the inside of the filter 2. To create this flow of exhaust gas, the end of the filter element remote from the gas incoming end is sealed by an iron plate 4 through a gasket.

(Experiment 1)

The cylindrical filters 1 and 2 of the filter element shown in FIGS. 2 and 3 were formed from an Ni-Cr-alloyed, Nibased three-dimensionally reticulated porous material (trade name: CELMET made by Sumitomo Electric Industries Ltd). The heater 3 was manufactured by stamping a thin Inconel plate, adjusting the resistance of the stamped member, and forming it into a cylindrical shape. It was heated by directly passing an electric current therethrough.

The resistance was adjusted so that the heater output would be 400 W when a voltage of 12 V was applied, irrespective of the length of the heater. The heater 3 may comprise a cylindrical heating medium made of punching metal, expanded metal, metal gauze or porous metal, and a sheathed heater wound around the heating medium.

Figure 6:
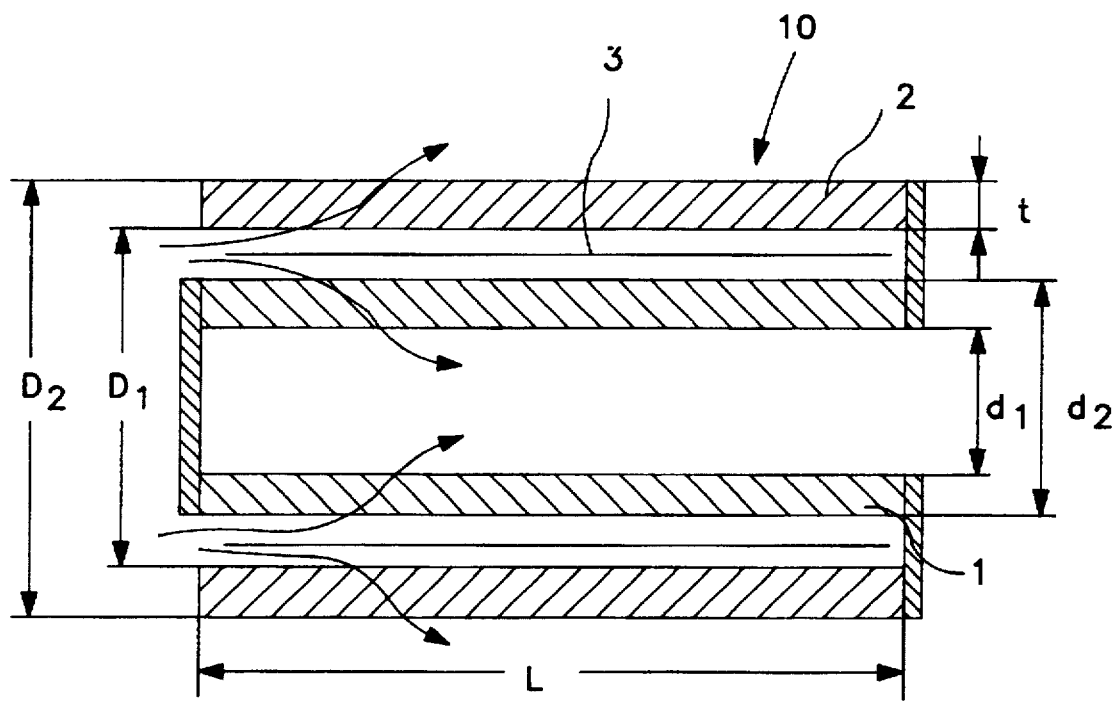
FIG. 6 is a view showing the dimensions of the filter element used in an experiment.

Heater-equipped filter elements of Comparative Examples 1–3 and Examples 1–3 as shown in Table 1 and having dimensions shown in FIG. 6 were prepared.

These specimens were tested for their regeneration properties.

In the experiment, each heater-equipped filter element 10 shown in FIG. 2 was set in the housing of DPF 11 shown in FIG. 1, and the engine was operated at 1800 rpm under ¼ of full charge until 1.5 g of particulates was trapped by the filter element.

In order to regenerate the filter, particulates were then burned by applying 12 V to the heater for 10 minutes from a constant-voltage power source in an exhaust atmosphere with the engine idling (oxygen content: 18%, temperature: 100° C., normal flow rate: 20 liters/min). The regeneration efficiency for each filter element was determined based on the following formulas to compare the regeneration properties.

Regeneration efficiency=$(1-A/B) \times 100(\%)$ wherein A=(filter pressure loss after regeneration) −(filter pressure loss before particulates are trapped)

B=(filter pressure loss after particulates are trapped)−(filter pressure loss before particulates are trapped)

The results are shown in Table 1.

As will be apparent from Table 1, Examples of the present invention all showed a regeneration efficiency higher than 80%. Thus, they can be advantageously used as particulate traps for medium- and small-sized cars.

(Experiment 2)

Figure 4:
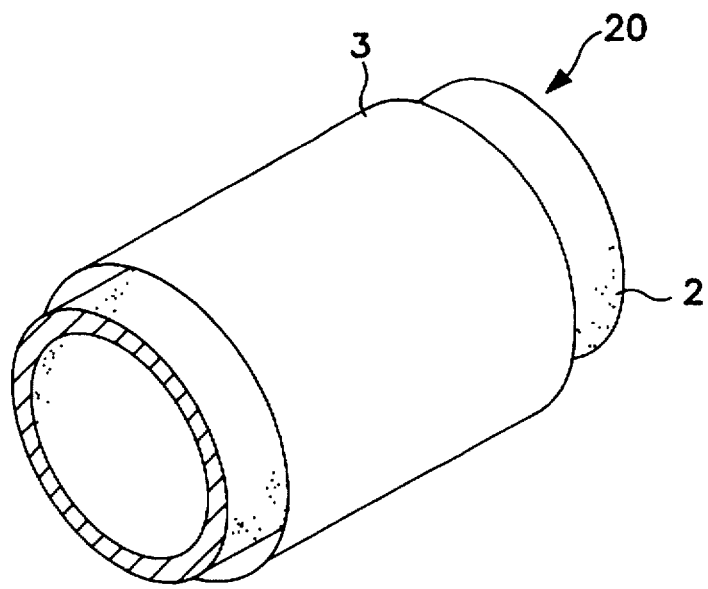
FIG. 4 is a perspective view of another type of filter element with a heater for use in a trap according to the present invention.

The following heater-equipped filter elements were formed from materials shown in Table 2: filter elements 20 each comprising a single cylindrical filter as shown in FIG. 4 (Examples 7 and 8); a filter element 20 (shown in FIG. 5) comprising a plurality of filters 5 in the form of flat plates arranged parallel to each other and having the spaces between the adjacent filters closed alternately at one and the other ends of the filter element with both sides of the spaces between adjacent filters 5 closed by the housing 11 (Example 9), and a filter element 10 comprising two cylinders as shown in FIGS. 2 and 3 (Example 10).

The heater 3 used in each of these filter elements was made of a thin Inconel plate with its resistance adjusted so that it will produce heating power as shown in Table 2 when a voltage of 12 V is applied. The filter and heater were sized so that the heating amount of the filter per unit area will be as shown in Table 2.

These specimens were subjected to the same experiment as in Experiment 1. The regeneration efficiency for each specimen is shown in Table 2. As shown in Table 2, the single-cylinder filter element and the flat-plate type filter element achieved results as good as the double-cylinder filter element.

The particulate trap according to the present invention has a shortened length to improve heat transfer efficiency and reduce the heat loss, and has an increased thickness to make up for reduction in filter surface area due to shortened length. With this arrangement, it is possible to achieve a sufficiently high regeneration efficiency using a heater with an output of 400 W or less without any marked reduction in the particulate trapping capacity. Such a particulate trap can be used even in medium and small diesel engine cars, which are typically small in the capacity of electric parts. Thus, the present invention will be of great help in purifying the environment.

TABLE 1

|  | Filter length L (mm) | Filter thickness t (mm) | Inner filter 2 | | Outer filter 1 | | Filter weight (g) | Heating amount per unit filter area (W/cm$^2$) | Regeneration efficiency |
|---|---|---|---|---|---|---|---|---|---|
|  |  |  | Inner dia $d_1$ (mm) | Outer dia $d_2$ (mm) | Inner dia $D_1$ (mm) | Outer dia $D_2$ (mm) |  |  |  |
| Comparative Example 1 | 270 | 3 | 36 | 42 | 54.5 | 60.5 | 270 | 0.49 | 20% |
| Comparative Example 2 | 240 | 3.6 | 34.8 | 42 | 54.5 | 61.7 | 270 | 0.55 | 55% |
| Comparative Example 3 | 240 | 2.5 | 37 | 42 | 54.5 | 59.5 | 160 | 0.55 | 62% |
| Example 1 | 220 | 4 | 34 | 42 | 54.5 | 62.5 | 270 | 0.60 | 82% |
| Example 2 | 200 | 4.5 | 33 | 42 | 54.5 | 63.5 | 270 | 0.66 | 93% |
| Example 3 | 160 | 5.1 | 31.8 | 42 | 54.5 | 64.7 | 270 | 0.82 | 100% |

TABLE 2

Figure 5:
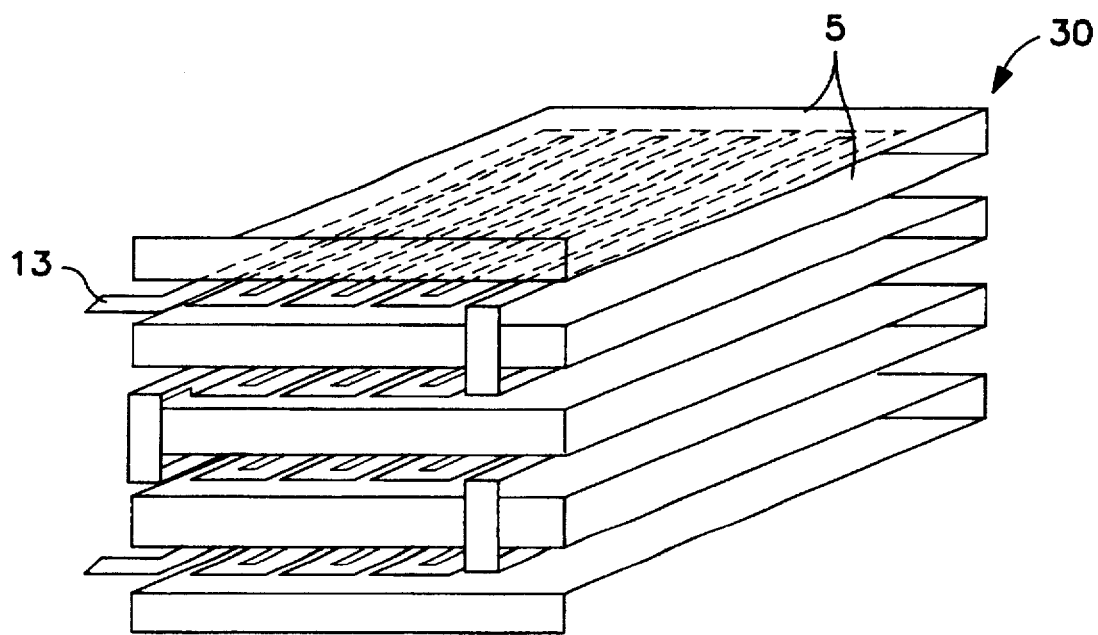
FIG. 5 is a perspective view of still another type of filter element with a heater for use in the trap according to the present invention.

|  | Filter structure | Filter material | Heater power (w) | Heating amount per unit filter area (W/cm$^2$) | Regeneration efficiency |
|---|---|---|---|---|---|
| Example 7 | Single tube of FIG. 4 | Ceramic fiber | 400 | 0.78 | 100% |
| Example 8 | Single tube of FIG. 4 | Metallic unwoven fabric of SUS | 400 | 0.67 | 95% |
| Example 9 | Parallel plates of FIG. 5 | Metalic unwoven fabric of SUS | 400 | 0.63 | 84% |
| Example 10 | Double tubes of FIG. 2, 3 | CELMET Ni—Cr | 300 | 0.62 | 86% |

*SUS = stainless steal

What is claimed is:

1. A particulate trap for use with a diesel engine, said particulate trap comprising:
   a filter made of a heat-resistant material having a thickness of at least 4 mm and a length of no more than 220 mm, said filter having an exhaust incoming surface; and
   a regenerating heater spaced a predetermined distance from said exhaust incoming surface of said filter, said regenerating heater having an output of no more than 400 watts and a length of no more than 220 mm such that said regenerating heater can provide said filter with an amount of heat that is at least 0.60 watts per square centimeter;
   wherein said filter comprises one selected from the group consisting of a three-dimensionally reticulated metallic porous member, a metallic unwoven fabric, and a combination of a three-dimensionally reticulated metallic porous member and a metallic unwoven fabric; and
   wherein said filter comprises a plurality of cylinders having different diameters from one another and arranged concentrically with one another with spaces between adjacent ones of said plurality of cylinders being alternately closed at one and the other ends thereof.

2. The particulate trap of claim 1, wherein one of said plurality of cylinders comprises a plurality of filter members laminated to one another, the one of said plurality of cylinders having a near side nearer to said exhaust incoming surface and a remote side further from said exhaust incoming surface than said near side, and the one of said plurality of cylinders being made of a coarser material on said near side than said remote side.

3. A particulate trap for use with a diesel engine, said particulate trap comprising:
   a filter made of a heat-resistant material having a thickness of at least 4 mm and a length of no more than 220 mm, said filter having an exhaust incoming surface; and
   a regenerating heater spaced a predetermined distance from said exhaust incoming surface of said filter, said regenerating heater having an output of no more than 400 watts and a length of no more than 220 mm such that said regenerating heater can provide said filter with an amount of heat that is at least 0.60 watts per square centimeter;
   wherein said filter comprises one selected from the group consisting of a three-dimensionally reticulated metallic porous member, a metallic unwoven fabric, and a combination of a three-dimensionally reticulated metallic porous member and a metallic unwoven fabric; and
   wherein said filter comprises a plurality of plates arranged parallel to one another with spaces between adjacent ones of said plurality of plates being alternately closed at one and the other ends thereof.

4. The particulate trap of claim 3, wherein one of said plurality of plates comprises a plurality of filter members laminated to one another, the one of said plurality of plates having a near side nearer to said exhaust incoming surface and a remote side further from said exhaust incoming surface than said near side, and the one of said plurality of plates being made of a coarser material on said near side than said remote side.

5. A particulate trap for use with a diesel engine, said particulate trap comprising:

- a filter made of a plurality of adjacent filter members each being made of a heat-resistant material and having a thickness of at least 4 mm, said filter having a length of no more than 220 mm, and said filter having an exhaust incoming surface; and

- a means for regenerating said filter by heating said filter with an amount of heat that is at least 0.60 watts per square centimeter, said means being spaced a predetermined distance from said exhaust incoming surface of said filter, having an output of no more than 400 watts, and a length of no more than 220 mm;

wherein said filter comprises one selected from the group consisting of a three-dimensionally reticulated metallic porous member, a metallic unwoven fabric, and a combination of a three-dimensionally reticulated metallic porous member and a metallic unwoven fabric; and wherein said filter has spaces between adjacent ones of said plurality of filter members that are alternately closed at one and the other ends thereof.

* * * * *